United States Patent [19]

Mitchell

[11] 4,261,825
[45] Apr. 14, 1981

[54] OXIDATION TANK FOR SEWAGE TREATMENT APPARATUS

[75] Inventor: Graham W. Mitchell, Niagara-on-the-Lake, Canada

[73] Assignee: Misener Holdings Limited, St. Catharines, Canada

[21] Appl. No.: 63,785

[22] Filed: Aug. 6, 1979

[30] Foreign Application Priority Data

Mar. 30, 1979 [CA] Canada .................................. 324546

[51] Int. Cl.³ .............................................. C02C 1/02
[52] U.S. Cl. ..................................... 210/220; 210/260
[58] Field of Search ............... 210/220, 221 A, 221 P, 210/258, 259, 260

[56] References Cited

U.S. PATENT DOCUMENTS

| | | | |
|---|---|---|---|
| 3,525,437 | 8/1970 | Kaeding et al. | 210/221 P |
| 3,828,933 | 8/1974 | Hampton | 210/220 X |
| 3,990,967 | 11/1976 | Hargraves | 210/220 X |
| 4,079,008 | 3/1978 | Neumann | 210/220 X |
| 4,104,167 | 8/1978 | Besik | 210/220 X |

*Primary Examiner*—John Adee

*Attorney, Agent, or Firm*—Ridout & Maybee

[57] ABSTRACT

There is provided a sewage treatment apparatus particularly intended for marine use where the apparatus is subject to tilting as a result of pitching and rolling of the ship. The apparatus includes an oxidation tank having a sewage liquor outlet incorporating a discharge weir. This weir is disposed at the center of a horizontal plane across the interior of the tank and containing the discharge weir, so that the above tilting of the tank substantially does not affect the rate of sewage liquor discharge and therefore substantially does not result in surging in the flow of sewage liquor from the oxidation tank to a settlement chamber. Such surging could adversely affect the maintenance of quiescent conditions in the settlement chamber. The settlement chamber is substantially fully enclosed and has a clarified liquid outlet incorporating an upstanding discharge weir presented coaxially by a top wall of the chamber. The chamber is operatively maintained substantially full, and since the free surface area of the sewage liquor in the chamber is minimized the above tilting of the chamber likewise does not adversely affect the maintenance of substantially quiescent conditions within the chamber.

12 Claims, 5 Drawing Figures

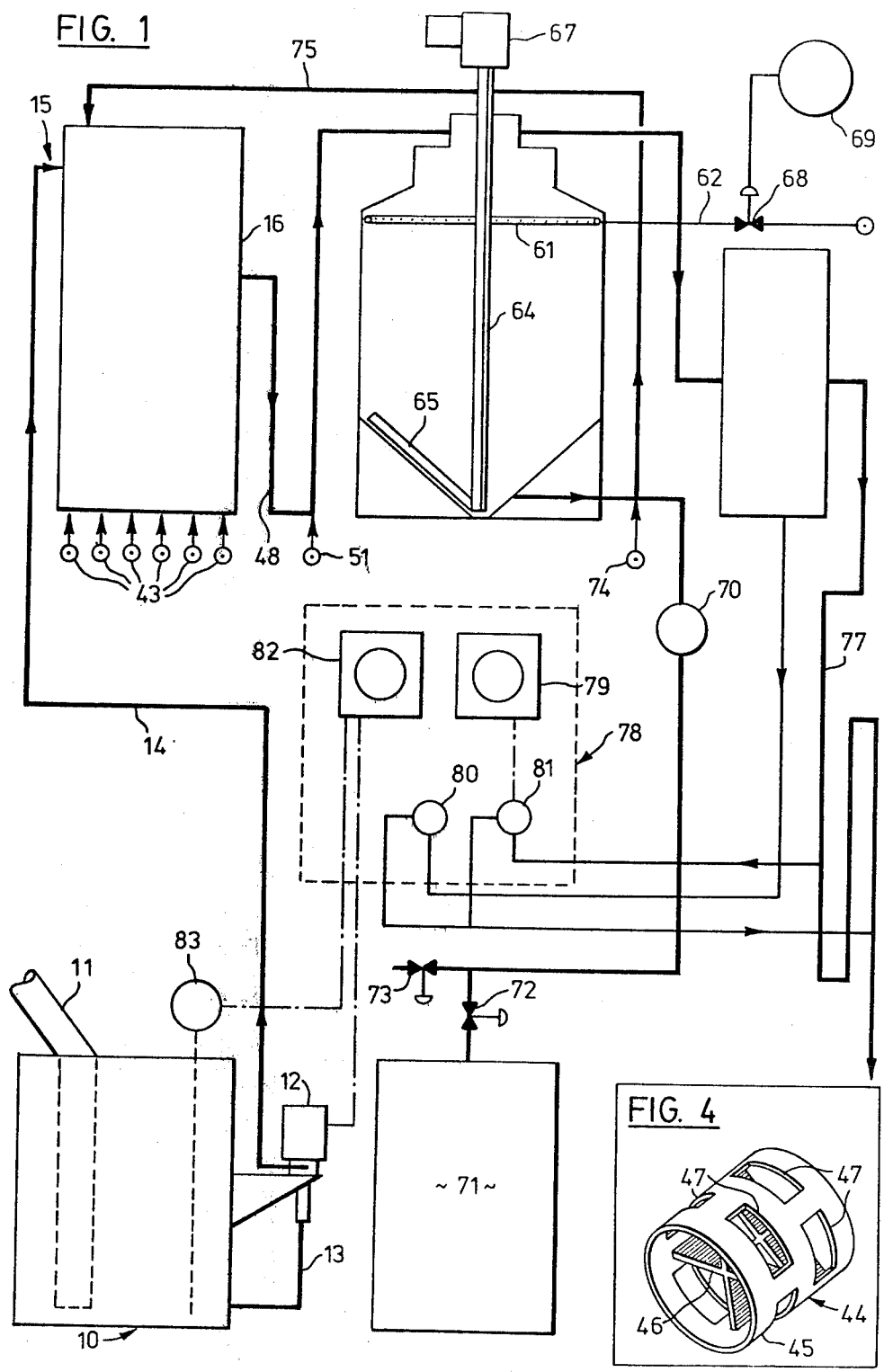

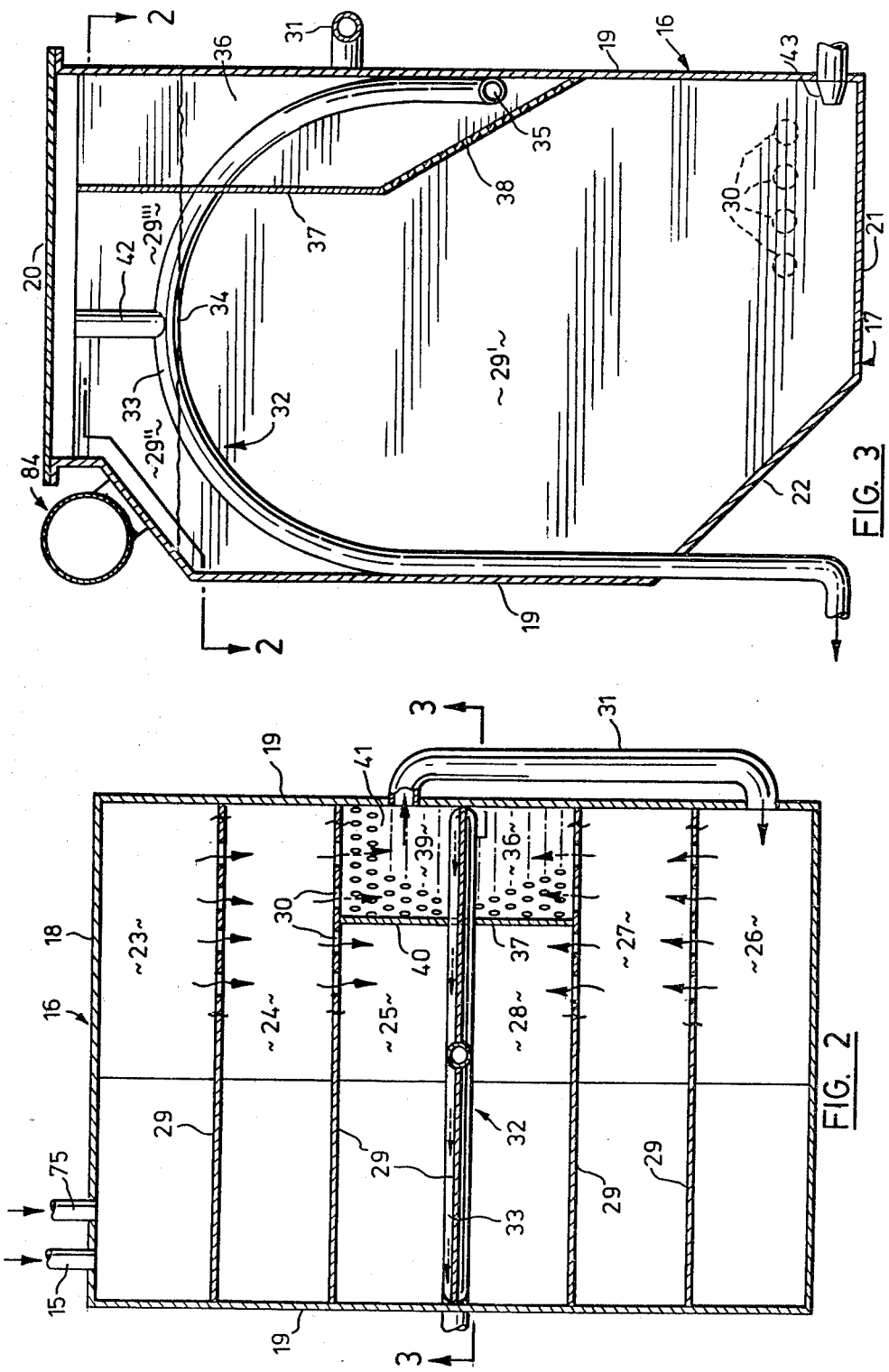

OXIDATION TANK FOR SEWAGE TREATMENT APPARATUS

This invention is concerned with sewage treatment apparatus, and more particularly with such apparatus intended for marine use in which the apparatus is operatively subject to tilting as a result of pitching and rolling of the ship in which the apparatus is installed. It is, however, to be emphasized that the apparatus may be used on land or in other environments in which it is not operatively subject to such tilting.

The present invention is more particularly concerned with the provision of an oxidation tank for such a sewage treatment apparatus. In this oxidation tank raw sewage supplied to the tank is treated by the action of aerobic bacteria, this treatment involving biological decomposition of the sewage by supplying oxygen or an oxygen-containing gas, usually air, to bacteria which feed on the combination of the oxygen and nutrients in the sewage. For satisfactory performance of this treatment it is important that the sewage be maintained in the oxidation tank for at least a minimum retention time in order to achieve adequate biological decomposition of the sewage. As will be appreciated, if operative tilting of the oxidation tank results in the discharge of sewage liquor from the tank at an uncontrolled rate of flow problems arise in ensuring that the sewage is maintained in the oxidation tank for at least the minimum retention time to achieve adequate biological decomposition of the sewage. It is accordingly a primary object of the present invention to provide an oxidation tank in which this disadvantage is substantially obviated or mitigated.

In accordance with the present invention there is provided an oxidation tank for a sewage treatment apparatus, the tank comprising a bottom wall and upstanding side walls and having a sewage level therein, a sewage inlet for supplying sewage to the tank, an outlet for discharging sewage liquor from the tank, and oxygen supply means for supplying oxygen to the interior of the tank. The outlet comprises a non-siphoning tube having an upwardly convex curved portion, the lowermost part of the interior of the tube at the apex of the curved portion thereof constituting a discharge weir which is disposed on said sewage level and at the centre of a horizontal plane across the interior of the tank and containing the discharge weir. An intake end of the tube is disposed at a level below said apex of the curved portion of the tube, and a vent pipe open to atmospheric pressure communicates with the apex of the curved portion of the tube.

The present invention is also concerned with the provision, in combination, of such an oxidation tank and a settlement chamber to which is supplied sewage liquor discharged from the oxidation tank. In this settlement chamber the sludge in the sewage liquor settles out, this sludge and the clarified liquid above the settled-out sludge being separately removed from the settlement chamber. This settling out of the sludge from the sewage liquor requires, of course, the maintenance of substantially quiescent conditions within the settlement chamber, and the maintenance of such quiescent conditions may be adversely affected to an unacceptable extent by operative tilting of the settlement chamber resulting from the above-described pitching and rolling of the ship in which the sewage treatment apparatus is installed. The maintenance of such quiescent conditions within the settlement chamber could, of course, also be adversely affected by surging in the flow of sewage liquor from the oxidation tank resultant from discharge of sewage liquor from the oxidation tank at an uncontrolled rate of flow, as hereinbefore described.

In a combination in accordance with the invention of an oxidation tank and a settlement chamber, the settlement chamber has an inlet for supplying sewage liquor to the chamber, an outlet adjacent the bottom of the chamber for discharging from the chamber sludge which has settled from the sewage liquor, and an outlet for discharging from the chamber clarified liquid from above the settled-out sludge. The chamber is substantially fully enclosed, and the clarified liquid outlet comprises an upstanding outlet presented by a top wall of the chamber, whereby the chamber is maintained substantially full during operative tilting thereof within a predetermined maximum angle.

In order that the invention may be more clearly understood and more readily carried into effect the same will now, by way of example, be more fully described with reference to the accompanying drawings in which FIG. 1 is a diagrammatic view of a sewage treatment apparatus incorporating an oxidation tank according to a preferred embodiment of the invention.

FIG. 2 is a sectioned, and partially broken away, top plan view of the oxidation tank shown in FIG. 1, the view being generally on the line 2—2 in FIG. 3;

FIG. 3 is a sectioned view on the line 3—3 in FIG. 2;

FIG. 4 is a view of one of a plurality of devices incorporated in the oxidation tank shown in the preceding views.

Figure 5:
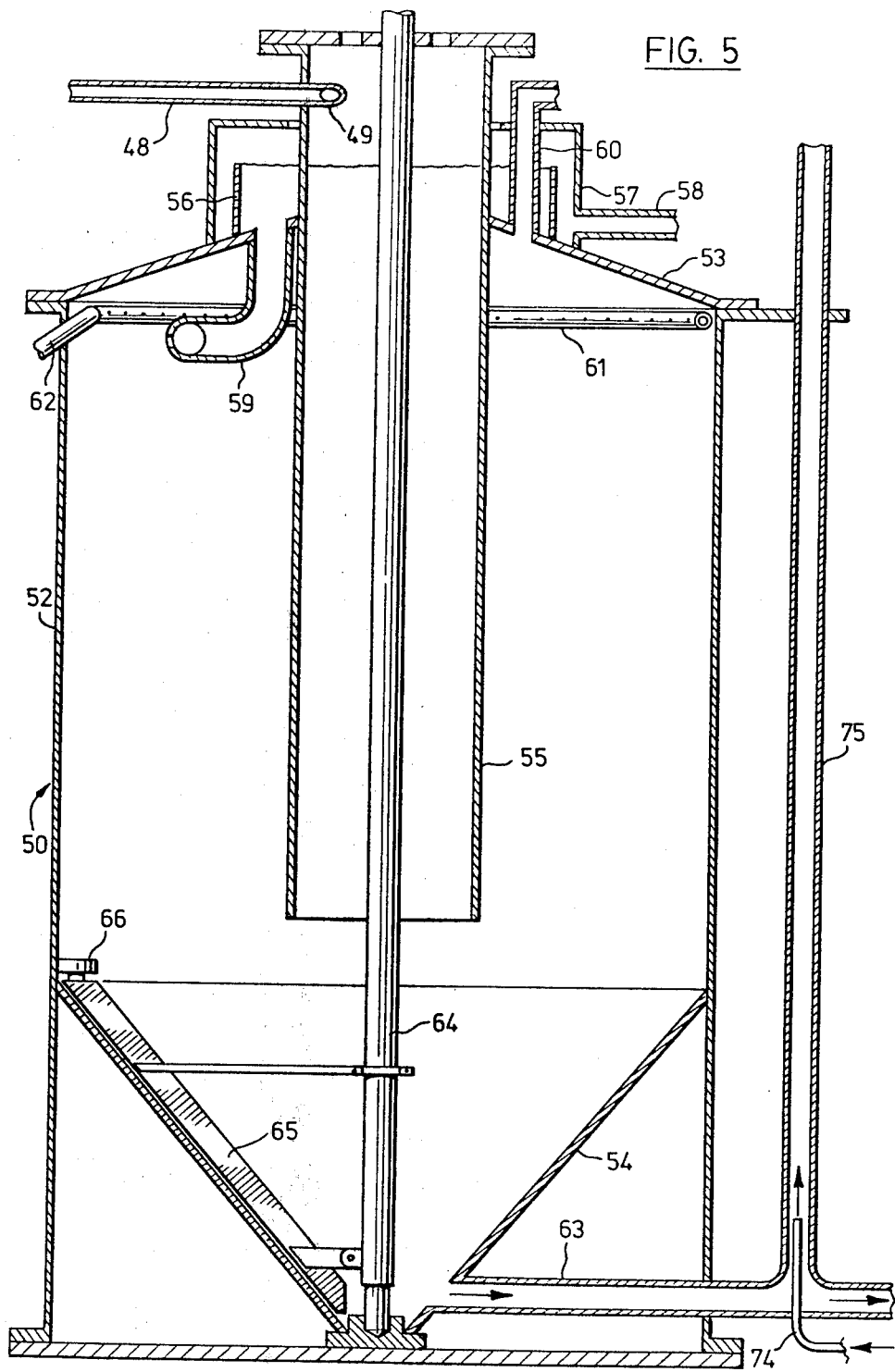
FIG. 5 is a vertically sectioned view of the settlement chamber shown in FIG. 1.

Referring to the drawings and particularly to FIG. 1 thereof, 10 denotes a sewage collection tank to which raw sewage is operatively supplied through a pipe 11. From the tank 10 the raw sewage is pumped by a pump assembly 12 through the lines 13 and 14 to an inlet 15 of an oxidation tank 16. The pump assembly 12 preferably incorporates a macerator for breaking up bodies of solid matter in the raw sewage.

Referring particularly to FIGS. 2 and 3, the oxidation tank 16 comprises a bottom wall 17, two pairs of opposed upstanding side walls 18 and 19, and a top wall or lid 20, the bottom wall 17 being constituted by a horizontal portion 21 and an inclined portion 22. The interior of the tank 16 is vented to the atmosphere by way of an open-ended duct 84.

Preferably, the interior of the tank 16 comprises a plurality of compartments 23, 24, 25, 26, 27 and 28 which are in side-by-side relationship and are separated by upstanding partition walls 29 disposed in spaced parallel relationship to the side walls 18. In the preferred embodiment illustrated, the plurality of compartments 23 through 28 comprises a first series of compartments, namely, the compartments 23, 24 and 25, and a second series of compartments, namely, the compartments 26, 27 and 28. Openings 30 are provided in the partition walls 29 between the compartments 23 and 24, 24 and 25, 26 and 27, and 27 and 28, these openings 30 each being disposed adjacent the bottom wall 17 for flow therethrough of sewage, as indicated by the appropriate arrows in FIG. 2. A duct 31 disposed externally of the tank 16 interconnects the last compartment 25 of the first series with the first compartment 26 of the second series for flow of sewage therebetween. The openings 30 and the duct 31 which are below the sewage level within the tank 16 together constitute transfer porting which interconnects the compartments 23 through 28 for flow of sewage progressively therethrough from a first one of the compartments, namely, the first compartment 23 of the first series to the last one of the compartments, namely, the last compartment 28 of the second series, the first compartments 23 and 26 of the first and second series being adjacent the opposed side walls 18, and the last compartment 25 of the first series being adjacent the last compartment 28 of the second series.

The inlet 15 communicates with the first one 23 of the compartments, and a sewage liquor outlet 32 communicates with the last one 28 of the compartments. This outlet 32 comprises a non-siphoning tube 33 having an upwardly convex curved portion, with the lowermost part of the interior of the tube 33 at the apex of the curved portion constituting a discharge weir 34 which is disposed on the sewage level within the tank 16 and at the centre of a horizontal plane across the interior of the tank 16 and containing the weir 34. The tube 33 has an intake end 35 which is disposed at a level below the discharge weir 34 and preferably within a pocket 36 provided in the compartment 28. This pocket 36 is constituted by a partition wall 37 through which the tube 33 passes and a perforated screen 38, so that sewage liquor flows through the screen 38 before entering the intake end 35 of the tube 33. The compartment 25 is preferably provided with a corresponding pocket 39 defined by a partition wall 40 and a perforated screen 41, the end of the duct 31 which communicates with the compartment 25 being in communication with this pocket 39 so that the sewage liquor passes through the screen 41 before entering the duct 31 for transfer to the compartment 26.

Although as herein described with reference to the accompanying drawings the tank 16 comprises a plurality of six compartments 23 through 28, it is to be understood that in alternative embodiments the tank 16 may comprise a greater or lesser number of compartments, with a minimum of two such compartments.

The tube 33 is rendered non-siphoning by the provision of a vent pipe 42 the lower end of which communicates with the apex of the curved portion of the tube 33 above the discharge weir 34 and the upper end of which is open to the interior of the tank 16.

As shown in FIG. 2, the tube 33 is in the plane of the partition wall 29 between the compartments 25 and 28, this partition wall 29 between the compartments 25 and 28 being in three parts 29', 29'', 29''' to accommodate the tube 33 and the vent pipe 42 to which the parts 29', 29'', 29''' are secured as by welding.

At or adjacent to the bottom wall 17 of the tank 16 is a plurality of air supply nozzles 43 at least one of which communicates with each of the compartments 23 through 28. These air supply nozzles 43 constitute oxygen supply means for supplying oxygen to the interior of the tank 16.

The air which is operatively supplied to the compartments 23 through 28 through the air supply nozzles 43 causes vigorous agitation in each of these compartments, and provides the required oxygen for the biological decomposition of the sewage. The sewage liquor passes progressively through the compartments 23 through 28, the sewage liquor then flowing through the screen 38 and from the compartment 28 into the intake end 35 of the tube 33 for discharge from the tank 16 over the discharge weir 34.

FIG. 4 shows a device 44 comprising a short cylindrical body 45 within each of the end portions of which is provided a cross-shaped member 46, with the two members 46 being offset by 45° relative to one another as viewed along the longitudinal axis of the body 45. Openings 47 are provided in the body 45 between the adjacent limbs of each cross-shaped member 46, these openings 47 in one end portion of the body 45 thus being offset relative to the openings 47 in the other end portion of the body 45.

A plurality of these devices 44 may be provided in each of the compartments 23 through 28. The majority of the devices 44 in each compartment have a density substantially equal to the specific gravity of water, so that these devices 44 freely tumble around in the respective compartment. In each compartment, however, there is preferably also provided a number of such devices 44 of higher density which serve to scour the bottom portion of the compartment. The devices 44 present an ideal environment for the growth of bacteria thereon, for ensuring satisfactory biological decomposition of the sewage. Furthermore, the action of the devices 44 against the perforated screens 38 and 41, serves to break up portions of solid sewage and other waste matter against these screens 38, 41.

Since the discharge weir 34 is disposed at the centre of the horizontal plane across the interior of the tank 16 and containing the weir 34, tilting of the tank 16 caused by pitching and rolling, or a combination of pitching and rolling, of the ship in which the sewage treatment apparatus is installed substantially does not affect the discharge of sewage liquor over the discharge weir 34. Thus, with the rate at which the raw sewage is supplied to the oxidation tank 16 by the pump assembly 12 maintained substantially constant, the rate of discharge of sewage liquor from the tank 16 is likewise maintained substantially constant, irrespective of such pitching or rolling of the ship in which the apparatus is installed. Accordingly, the sewage may be retained in the oxidation tank 16 for at least the minimum retention time required for satisfactory biological decomposition of the sewage.

From the oxidation tank 16 the sewage liquor is supplied through a pipe 48 to a sewage liquor inlet 49 of a settlement chamber 50, the inlet 49 being at a higher level than the outlet 32 from the tank 16 with an air lift 51 being incorporated in the pipe 48 for causing flow of the sewage liquor therethrough. The settlement chamber 50 preferably comprises a substantially cylindrical side wall 52, a top wall 53 and a bottom wall 54, the top wall 53 being of conical form and the bottom wall 54 being of inverted conical form. The sewage liquor inlet 49 discharges into a cylindrical duct 55 which is coaxially disposed relative to the axis of the conical top wall 53 and which extends downwardly into the chamber 50. Presented by the top wall 53 is an upstanding outlet 56 for the discharge of clarified liquid from the chamber 50, the outlet 56 in the preferred embodiment illustrated comprising an upstanding annular discharge weir which surrounds and is coaxially disposed relative to the duct 55. The weir 56 is provided within an annular chamber 57 which coaxially surrounds the duct 55, the chamber 57 and the upper end of the duct 55 being vented to the atmosphere. An outlet line 58 communicates with a lower portion of the chamber 57. One end of a pipe 59 communicates with the interior of the discharge weir 56, and the other end of this pipe 59 communicates with the interior of the chamber 50 at a spaced distance below the top wall 53. Adjacent to the top wall 53 there may be provided means for introducing air into the chamber 50, this air operatively serving to air lifting floating scum up a pipe 60 for recirculation to the oxidation tank 16. The means for introducing the air into the chamber 50 may comprise a perforated ring-like member 61 which is disposed coaxially with the duct 55 and substantially at the level of the junction between the top wall 53 and the cylindrical side wall 52, an air inlet line 62 being provided for supplying air to the ring-like member 61.

A sludge discharge outlet 63 is provided adjacent the bottom of the chamber 50, and preferably adjacent to the lowermost part of the inverted conical bottom wall 54, for the removal of settled-out sludge from the chamber 50. A shaft 64 is coaxially disposed within the chamber 50, a wiper blade 65 which is in wiping contact with the bottom wall 54 of the chamber 50 being mounted on the lower end portion of the shaft 64, with a freely rotatable guide roller 66 being mounted on the upper end of the wiper blade 65 in rolling contact with the cylindrical side wall 52. The upper end of the shaft 64 is connected through reduction gearing denoted by the reference numeral 57 in FIG. 1 to an appropriate drive mechanism for operative rotation at low speed of the shaft 64 and the wiper blade 65 thereby to prevent build-up of sludge on the bottom wall 54 of the chamber 50.

The sludge in the sewage liquor which is supplied to the chamber 50 through the inlet 49 and the duct 55 settles out at the bottom of the chamber 50 and is discharged through the sludge outlet 63. Clarified liquid above the settled-out sludge is discharged over the weir 56 and through the clarified liquid outlet line 58.

It will be noted that the settlement chamber 50 is substantially fully enclosed. In operation, this chamber 50 is maintained substantially full thereby minimizing the free surface area of the sewage liquor therein. As a result, tilting of the settlement chamber 50 caused by pitching or rolling, or pitching and rolling, of the ship within predetermined maximum angles does not adversely affect the maintenance of substantially quiescent conditions in the chamber 50, and accordingly does not adversely affect to any substantial extent the settling out in the chamber 50 of the sludge from the clarified liquid. Furthermore, since the rate of discharge of sewage liquor from the oxidation tank 16 to the settlement chamber 50 is maintained substantially constant surging in this sewage liquor entering the chamber 50 is substantially avoided. Such surging could adversely affect the maintenance of the substantially quiescent conditions in the chamber 50. Since the supply of air to the ring-like member 61 does tend adversely to affect the maintenance of quiescent conditions in the chamber 50 this supply of air is provided only intermittently as controlled by a valve 68 which is incorporated in the line 62 and which is coupled to an automatic timer 69.

The angle of inclination of the conical top wall 53 is preferably a few degrees greater than the predetermined maximum angles of operative tilting of the chamber 50. Thus, for example, where the predetermined maximum angle of operative tilting is, say, 15° to the vertical the angle of inclination of the conical top wall 53 may be of the order of 17°.

A proportion of the sludge discharged through the outlet 63 is withdrawn through a sludge metering pump 70 for storage in a sludge tank 71 or for incineration in, for example, the ship's boiler, valves 72 and 73 controlling whether the sludge passing through the pump 70 is supplied to the storage tank 71 for subsequent pumping ashore, or to the ship's boiler. The remainder of the sludge discharged through the outlet 63 is recirculated by means of an air lift 74 through the line 75 to the compartment 23 of the oxidation tank 16, the end of the line 75 which discharges into the compartment 23 being adjacent the inlet 15. Although it may be necessary to supply a quantity of activated carbon to the oxidation tank 16 at startup of the apparatus in order to achieve satisfactory performance of the treatment process, the proportion of discharged sludge which is withdrawn through the pump 70 is relatively small and accordingly the rate of removal of the activated carbon from the apparatus is low.

The clarified liquid discharged through the outlet line 58 passes to a disinfection unit 76 which may comprise an ultra-violet radiation unit. This ultra-violet radiation unit 76 may be of conventional form and may incorporate a scraper assembly for automatic cleaning thereof. From the ultra-violet radiation unit 76 the disinfected clarified liquid passes through line 77 for discharge overboard or for re-use as, for example, toilet flushing water.

78 denotes monitoring equipment comprising a unit 79 for indicating the turbidity and disinfection levels of the disinfected clarified liquid passing through the line 77, this unit 79 being controlled by a turbidity sensor 81 through which a portion of the disinfected clarified liquid is diverted before being returned to the line 77. The part of the line 77 between the positions of removal and return of this diverted portion of the disinfected clarified liquid is disposed as shown in FIG. 1 to ensure that the sensor 81 is operatively maintained full of the disinfected clarified liquid. The monitoring equipment 78 also comprises a flow and level recording unit 82 which is controlled by a signal indicating operation of the pump assembly 12 and by a level indicating device 83 mounted in association with the tank 10. Associated with the ultra-violet radiation unit 76 is a device for monitoring the operation of the unit 76, such that in the event of a malfunction in the operation of the disinfection process of the unit 76 an alarm 80 is sounded.

What I claim is:

1. An oxidation tank for a sewage treatment apparatus, the tank comprising a bottom wall and upstanding side walls and having a sewage level therein, a sewage inlet for supplying sewage to the tank, an outlet for discharging sewage liquor from the tank, and oxygen supply means for supplying oxygen to the interior of the tank, the outlet comprising a non-siphoning tube having an upwardly convex curved portion, the lowermost part of the interior of the tube at the apex of the curved portion thereof constituting a discharge weir which is disposed on said sewage level and at the centre of a horizontal plane across the interior of the tank and containing the discharge weir, an intake end of the tube being disposed at a level below said apex of the curved portion of the tube, and a vent pipe open to atmospheric pressure communicating with the apex of the curved portion of the tube.

2. An oxidation tank according to claim 1, wherein the interior of the tank comprises a plurality of compartments disposed in side-by-side relationship, transfer porting interconnecting the compartments for flow of sewage progressively through the compartments from a first one of the compartments to a last one of the compartments, the sewage inlet being in communication with said first one of the compartments, and the outlet being in communication with said last one of the compartments.

3. An oxidation tank according to claim 2, wherein the plurality of compartments is constituted by a first series of compartments and a second series of compartments, each of said series of compartments comprising a first compartment and a last compartment, with the first compartment of the first series being adjacent a side wall of the tank and constituting said first one of the compartments, and with the first compartment of the second series being adjacent an opposed side wall of the tank, the last compartment of the second series constituting said last one of the compartments and being adjacent the last compartment of the first series.

4. An oxidation tank according to claim 3, wherein upstanding partition walls separate the compartments, and the transfer porting interconnecting the compartments of each series comprises openings in the partition walls separating the compartments of the series, the transfer porting interconnecting the last compartment of the first series with the first compartment of the second series comprising a duct extending therebetween.

5. In combination, an oxidation tank and a settlement chamber for a sewage treatment apparatus, the oxidation tank comprising a bottom wall and upstanding side walls and having a sewage level therein, a sewage inlet for supplying sewage to the tank, an outlet for discharging sewage liquor from the tank, and oxygen supply means for supplying oxygen to the interior of the tank, the outlet comprising a non-siphoning tube having an upwardly convex curved portion, the lowermost part of the interior of the tube at the apex of the curved portion thereof constituting a discharge weir which is disposed on said sewage level and at the centre of a horizontal plane across the interior of the tank and containing a discharge weir, an intake end of the tube being disposed at a level below said apex of the curved portion of the tube, and a vent pipe open to atmospheric pressure communicating with the apex of the curved portion of the tube, the settlement chamber having an inlet for supplying sewage liquor to the chamber, an outlet adjacent the bottom of the chamber for discharging from the chamber sludge which has settled out from the sewage liquor, and an outlet for discharging from the chamber clarified liquid from above the settled out sludge, the chamber being substantially fully enclosed, and the clarified liquid outlet comprising an upstanding outlet presented by the top wall of the chamber, whereby the chamber is maintained substantially full during operative tilting thereof within a predetermined maximum angle, and a pipe connecting the outlet of the oxidation tank to the sewage liquor inlet of the settlement chamber for flow of sewage liquor therethrough from the oxidation tank to the settlement chamber.

6. A combination according to claim 5, wherein the sewage liquor inlet of the settlement chamber is at a higher level than the outlet of the oxidation tank, and an air lift is incorporated in the pipe therebetween for causing flow of sewage liquor through said pipe.

7. A combination according to claim 5, wherein the top wall of the settlement chamber is of conical form.

8. A combination according to claim 5, wherein the upstanding outlet of the clarified liquid outlet of the settlement chamber comprises an upstanding discharge weir.

9. A combination according to claim 7, wherein the upstanding outlet of the clarified liquid outlet of the settlement chamber comprises an upstanding annular weir co-axially disposed relative to the axis of the conical top wall.

10. A combination according to claim 5, wherein the clarified liquid outlet of the settlement chamber further comprises a pipe, one end of which communicates with the upstanding outlet and the other end of which communicates with the interior of the settlement chamber at a spaced distance below the top wall thereof, whereby clarified liquid operatively discharged through the clarified liquid outlet is supplied from below the top wall of the chamber.

11. A combination according to claim 5, wherein a wiper blade is rotatably mounted within the settlement chamber in wiping contact with the bottom of the chamber.

12. A combination according to claim 5, wherein the bottom of the settlement chamber is of inverted conical form, the sludge outlet being provided in the inverted conical bottom of the chamber adjacent the lowermost part thereof.

* * * * *